2 Sheets—Sheet 1.

B. C. DAVIS.
Shutter.

No. 206,088. Patented July 16, 1878.

Witnesses;
T. J. Lacey.
J. B. Cosgrave.

Inventor;
Biram C. Davis.

2 Sheets—Sheet 2.

B. C. DAVIS.
Shutter.

No. 206,088. Patented July 16, 1878.

Witnesses:
Floyd Norris
D. P. Cowl

Inventor:
Biram C. Davis,
By Johnson & Johnson
Attys

UNITED STATES PATENT OFFICE.

BIRAM C. DAVIS, OF BINGHAMTON, NEW YORK.

IMPROVEMENT IN SHUTTERS.

Specification forming part of Letters Patent No. 206,088, dated July 16, 1878; application filed May 1, 1878.

*To all whom it may concern:*

Be it known that I, BIRAM C. DAVIS, of Binghamton, in the county of Broome and State of New York, have invented a new and useful Improvement in Window - Blinds, of which the following is a specification:

I have improved the window-blind-slat operating attachment in which the slats are opened and closed at one movement.

A laterally-rolling slat-operating bar is arranged at the ends of the slats, and connected thereto in such a manner as to lie, when the slats are closed, close against the inner side of the stile of the blind, and in connection with such rolling bar an adjustable spring-arm is arranged near the middle of the length of the stile, so as to project inward therefrom and overlie and clamp, by its spring-pressure, the operating-bar upon the slats, to hold them tightly and securely closed. This adjustable spring-arm serves, also, the important function of holding the slats open, and at any desired angle up or down, by its inner end forming a support, upon which the end of the slat rests directly, so that by turning said spring-arm up or down upon its screw-stem it supports the slats at the required angle.

This adjustable spring arm, in combination with a laterally-rolling slat-operating bar, is new, so far as I know, for the purpose stated.

An offset-staple connects the upper end of the operating-bar to the upper slat, and extends above and from said bar, and enters a small recess in the top rail, whereby the operating-bar is allowed to roll toward and from the stile clear of the top rail, so that the length of the operating-bar is just sufficient to pass between the top and bottom rails of the blind, and the necessity for a large recess at the top is avoided, as the cut is only sufficient to admit the lateral play of the eye of the staple. This offset-staple connection gives the advantage of using a rolling operating-bar, adapted to be clamped directly against the inner side of the stile, without unnecessarily cutting and marring the top rail.

By my improvements the cost of manufacture is lessened, the appearance is improved, and the adjustment—holding and fastening of the slats—is rendered effective, especially in excluding dust and wind, and in preventing rattling.

Figure 1:
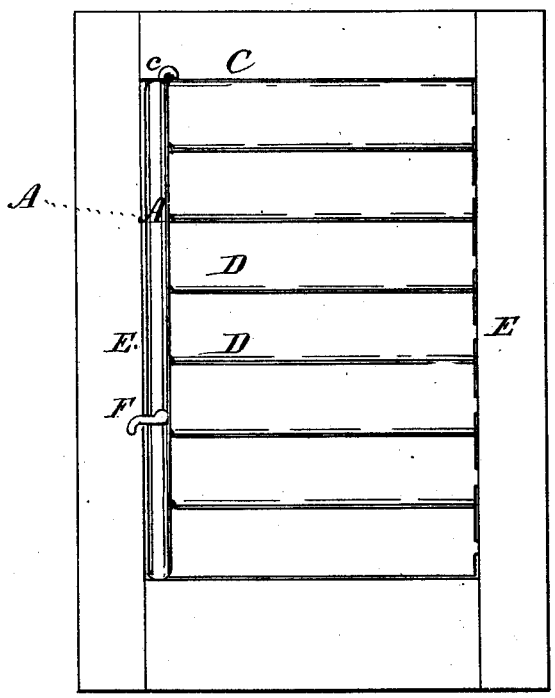
Figure 2:
Figure 3:
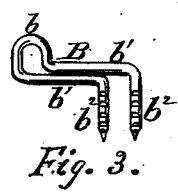
Figure 4:
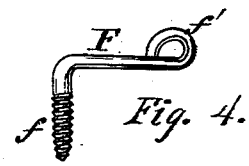
Figure 5:
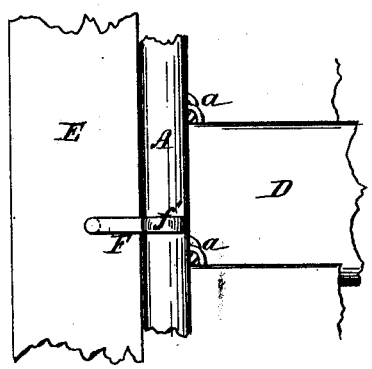
Figure 6:
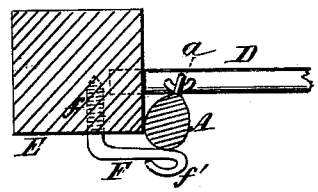
Figure 7:
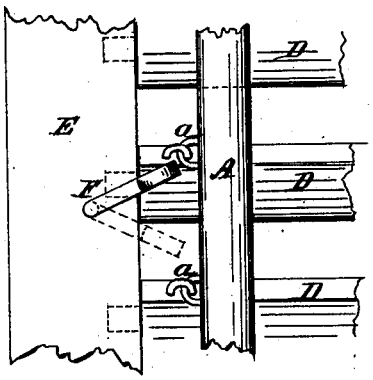
Figure 8:
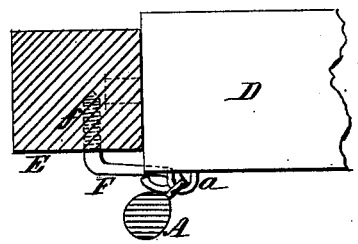
Figure 9:
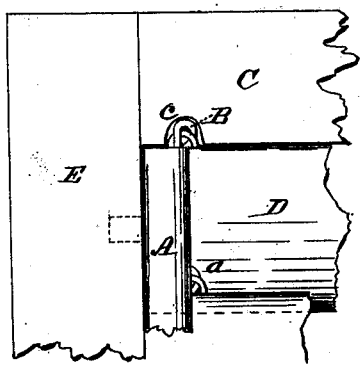
Figure 10:
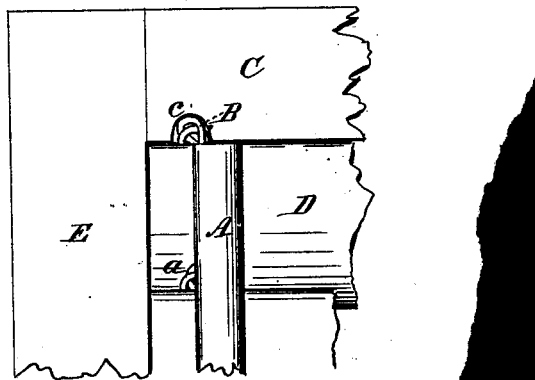

Referring to the drawings, Figure 1 represents an elevation of a rolling slat-blind, embracing my improvements; Fig. 2, a portion of the operating-bar, showing the top offset-staple; Fig. 3, the bar offset-staple; Fig. 4, the adjustable spring-arm; Fig. 5, a detailed front view, showing the operating-bar clamped against the stile; Fig. 6, a horizontal section of the same; Fig. 7, a detail front view, showing the spring-arm supporting the slats open at an angle; Fig. 8, a horizontal section of the same; and Figs 9 and 10, details, showing the offset staple-bar connection with the top slat as it works in the top-rail recess. These several views, except Fig. 1, are enlarged.

The slats D are pivoted to the stiles E by a tenon or trunnion at each end, and project into corresponding holes in the stiles, in the usual manner. The operating-rod A is arranged at the ends of the slats, and connected therewith by interlocked staples $a$, so as to allow it to have a lateral rolling movement against and from the inner side of the stile, in order to adapt it for the action of an adjustable spring clamping and holding arm, F, secured by a right-angled screw-shank, $f$, in the face of and near the middle of the length of the stile. This spring-arm extends inward beyond the inner side of the stile a distance sufficient to pass over the operating-bar, as shown in Fig. 6, so that the latter can be rolled under and be clamped by said arm upon the slats when the latter are closed, and thus hold and bind them firmly together, so that they cannot be opened from the outside. The spring-arm for this purpose is made stiff, and the operating-bar is made partially cylindrical in cross-section, so that it will readily pass beneath said spring-arm and be clamped thereby snug against the inner side of the stile, and yet allow it to be readily rolled back from beneath the said spring-arm, as in Fig. 7, to open the slats.

The spring-arm is adjusted by turning it upon its screw-shank $f$, to give the proper pressure, and yet it has sufficient spring to yield in rolling the rod beneath it, and to hold said rod firmly against the stile, so as to make a close joining therewith. The spring-arm serves, also, the important purpose of a rest to hold the slats open, and to adjust them at any angle, as the slats, when open, are supported with their ends upon the inner end of said spring-arm, and by adjusting the latter up or down the slats may be held at different angles. The position of the spring-clamping arm gives this advantage, and also allows the operating-bar to be rolled outward beyond the ends of the slats, as in Fig. 8, so that very little of the space between the stiles is obstructed, while neither the slats nor their operating-bar are notched or cut in any way to effect such adjustment.

To adapt the rolling operating-bar to its connection with the top slat, and avoid making a large cut or recess in the top rail C, I make such connection by means of an offset-staple, B, Fig. 3, bent of a single piece, to form the eye $b$, with the shanks $b^1$ $b^1$ at right angles thereto, and terminating in pointed corrugated ends $b^2$ $b^2$, in line with each other, and which are driven into the bar, so that the shanks $b^1$ $b^1$ lie in a groove therein and make a strong hold, as shown in Fig. 2, so that the eye will project above the end of and from said bar in line with the slat-connecting staples $a$, and this laterally-projecting staple $b$ extends into the recess $c$, and rolls therein with the rolling movement of the bar in fastening and unfasting the slats, so that the bar is made shorter than heretofore, and rolls between the top and bottom rails. Were it not for this laterally-projecting staple to make the bar-and-slat connection, a rolling slat-operating bar could not be used without cutting a large recess in the upper rail, which would be so objectionable as to prevent the use of the rolling bar.

The spring-arm F has a turned end, $f'$, by which it is turned to adapt it to hold the slats at different angles, or to suit the thickness of the operating-rod.

I claim—

1. In a window-blind of rolling slats, the combination, with a laterally-rolling slat-operating bar, of a spring-arm secured in the stile and adapted to allow said bar to be rolled thereunder, and to hold it against the side of the stile and upon the slats, and to hold the latter open at different angles.

2. The combination, with a laterally-rolling slat-connecting bar, of an offset-staple at the top of said bar adapted to roll in the rail-recess, for the purpose stated.

BIRAM C. DAVIS.

Witnesses:
T. I. LACEY,
J. B. COSGRAVE.